United States Patent Office 3,634,452
Patented Jan. 11, 1972

3,634,452
CHLORAL COMPOUNDS
Adolf Fischer, Mutterstadt, Friedrich Becke, Heidelberg, and Reinhold Kohlhaupt, Frankenthal, Germany, assignors to Badische Anilin- & Soda-Fabrik Aktiengesellschaft, Ludwigshafen (Rhine), Germany
No Drawing. Filed May 14, 1969, Ser. No. 824,661
Claims priority, application Germany, May 14, 1968,
P 17 70 409.5
Int. Cl. C07d 27/50
U.S. Cl. 260—325                        3 Claims

ABSTRACT OF THE DISCLOSURE

New and valuable chloral compounds having the formula:

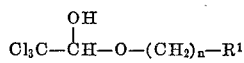

in which $R^1$ denotes the radical

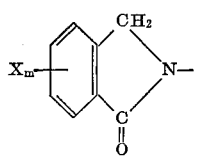

or the radical

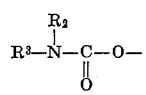

X denoting halogen or a cyano, nitro, alkyl, alkenyl, alkoxyl, haloalkyl or haloalkenyl radical (the various meanings of X may be identical or different), $m$ denotes one of the integers from 0 to 4, $n$ denotes one of the integers from 0 to 6, $R^2$ denotes hydrogen or a lower alkyl radical or alkenyl radical and $R^3$ denotes hydrogen or the trichloroethylol radical

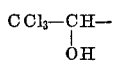

---

The chloral compounds have a good herbicidal action. In particular, they are suitable for controlling unwanted plants between crop plants without damaging the latter. The chloral compounds have an especially strong action on unwanted grassy plants.

The present invention relates to chloral compounds and herbicides containing them.

It is known to use chloralides, particularly glycolic acid chloralide (DAS 1,059,710) as herbicidal agents; however, their action is unsatisfactory.

An object of the invention is new and valuable chloral compounds. Another object of the invention is chloral compounds which have a strong herbicidal action. A further object of the invention is a process for controlling unwanted plants with chloral compounds without damaging crop plants. These and other objects of the invention are achieved by chloral compounds having the formula

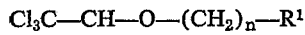

in which $R^1$ denotes the radical

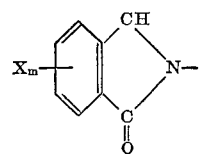

X denoting halogen (chlorine, bromine), a cyano or nitro group, an alkyl or alkenyl radical having 1 to 5 carbon atoms (methyl, ethyl, propyl, isopropyl, butyl, isobutyl), and alkoxyl (methoxy, ethoxy), haloalkyl (chloromethyl, trichloromethyl, trifluoromethyl, tribromomethyl) or haloalkenyl radical (the various meanings of X may be identical or different), $m$ denotes one of the integers from 0 to 4, $n$ denotes one of the integers from 0 to 6.

The agents for regulating plant growth according to this invention may be used as solutions, emulsions, suspension or dusts. The form of application depends entirely on the purpose for which the agents are being used; in any case it should ensure a fine distribution of the active ingredient.

For the preparation of solutions to be sprayed direct, hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts, concentrates which are suitable for dilution with water may be prepared from active ingredient, emulsifying or dispersing agent and possibly solvent.

Dusts may be prepared by mixing or grinding the active ingredients with a solid carrier, e.g. clay, talc, diatomaceous earth or a fertilizer. It is also possible to mix the active ingredients with fungicides, insecticides or with other herbicidal active ingredients.

The active ingredients may be obtained by reaction of chloral with the corresponding amine or hydroxy compounds. The preparation of the active ingredients according to the invention is illustrated by the following examples:

EXAMPLE 1

N-(2-trichloro-1-hydroxyethoxyethyl)-phthalimidine (I)

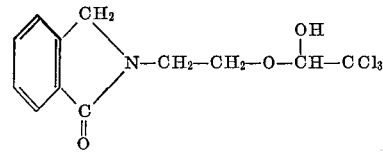

885 parts (by weight) of N-(2-hydroxyethyl)-phthalimidine is dissolved in 4,500 parts of carbon tetrachloride; the solution is reacted within 3 hours with 800 parts of chloral at 60° to 70° C. and with the addition of 2 parts of $H_2SO_4$. After having been allowed to cool, the precipitated colorless crystals are suction-filtered and washed with carbon tetrachloride.

Yield: 153 parts (94% of the theory) of I having a melting point of 127° to 128° C.

EXAMPLE 2

N-(1-hydroxy-2-trichloroethyl)-1'-hydroxy-2'-trichloroethoxyethylcarbamate (II)

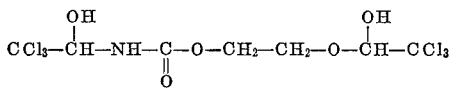

525 parts of 2-hydroxyethylcarbamate in 4,500 parts of ethyl acetate is reacted with 1,475 parts of chloral, as in Example 1. After the solvent has been distilled off, a pale yellow oil is obtained; $n_D^{20}=1.5021$.

The following comparative experiments illustrate the superiority of the compounds according to the invention over known active ingredients.

EXAMPLE 3

Loamy sandy soil is filled into pots and sown with the seeds of annual meadow grass (*Poa annua*), orchard grass (*Dactylis glomerata*), wild oats (*Avena fatua*), barnyard grass (*Echinochloa crus-galli*) and green foxtail (*Setaria viridis*). The soil is subsequently treated with 4 kg. of I and 4 kg. of II and, for comparison, with 4 kg. of glycolic acid chloralide (III) having the formula

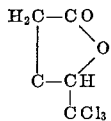

these amounts of the active ingredients each being dispersed in 500 liters of water per hectare, and planted with tomatoes. After 4 to 5 weeks it is ascertained that I and II have not only a stronger herbicidal action than III, but also superior compatibility with tomatoes. The results of the experiment may be seen from the following table:

|  | Active ingredient | | |
|---|---|---|---|
|  | I | II | III |
| Tomatoes | 0–10 | 10 | 20–30 |
| Annual meadow grass | 70–80 | 80 | 60–70 |
| Orchard grass | 80 | 80 | 70 |
| Wild oats | 80 | 80–90 | 60–70 |
| Barnyard grass | 90–100 | 80 | 50–60 |
| Green foxtail | 90 | 80–90 | 60 |

NOTE.—0=no damage; 100=total destruction.

EXAMPLE 4

Loamy sandy soil is placed in dishes; the seeds of beet (*Beta vulgaris*), soya beans (*Glycine hispida*) and large crabgrass (*Digitaria sanguinalis*) are sown in rows in each dish. The soil is subsequently treated with 4 kg. per hectare of I and 4 kg. per hectare of II, these amounts of the active ingredients each being dispersed in 500 liters of water per hectare. The following results are ascertained after 4 to 5 weeks:

|  | Active ingredient | |
|---|---|---|
|  | I | II |
| Beet | 10–20 | 10 |
| Soya beans | 10 | 20 |
| Large crabgrass | 90–100 | 80–90 |

EXAMPLE 5

The plants soya beans (*Glycine hispida*), beet (*Beta vulgaris*), tomatoes (*Solanum lycopersicum*), annual meadow grass (*Poa annua*), orchard grass (*Dactylis glomerata*), barnyard grass (*Echinochloa crus-galli*) and green foxtail (*Setaria viridis*) are treated at a growth height of 3 to 12 cm. with 3 kg. per hectare of I and 3 kg. per hectare of II, these amounts of the active ingredients each being dispersed in 500 liters of water per hectare.

After 3 to 4 weeks it is ascertained that the weeds annual meadow grass, orchard grass, barnyard grass and green foxtail are almost completely withered, whereas the plants soya beans, beet and tomatoes continue to grow almost undamaged.

We claim:

1. A chloral compound having the formula

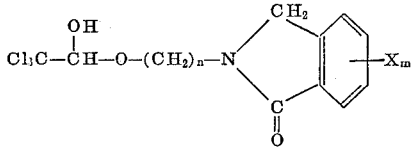

wherein X denotes chloro, bromo, cyano, nitro, alkyl of 1–5 carbon atoms, methoxy, ethoxy or halomethyl, $m$ denotes one of the integers from 0 to 4, and $n$ denotes one of the integers 1 to 6.

2. A compound as claimed in claim 1 wherein $n$ is 2.
3. N-(2 - trichloro - 1 - hydroxyethoxyethyl)-phthalimidine.

References Cited

UNITED STATES PATENTS 2,857,396  10/1958  Wheeler et al. _____ 260—325

ALEX MAZEL, Primary Examiner

J. A. NARCAVAGE, Assistant Examiner

U.S. Cl. X.R.

260—482 C; 71—96, 105, 106

UNITED STATES PATENT OFFICE
CERTIFICATE OF CORRECTION

Patent No. 3,634,452          Dated January 11, 1972

Inventor(s) Adolf Fischer, Friedrich Becke, and Reinhold Kohlhaupt

It is certified that error appears in the above-identified patent and that said Letters Patent are hereby corrected as shown below:

Column 1, line 67, that portion of the formula reading "CH" should read -- $CH_2$ --.

Column 3, line 10, that portion of the formula reading "C" should read -- O --.

Signed and sealed this 6th day of June 1972.

(SEAL)
Attest:

EDWARD M. FLETCHER, JR.
Attesting Officer

ROBERT GOTTSCHALK
Commissioner of Patents